(12) United States Patent
Sridhar et al.

(10) Patent No.: US 7,843,845 B2
(45) Date of Patent: Nov. 30, 2010

(54) DIAGNOSTIC TOOL AND METHOD FOR TROUBLESHOOTING MULTICAST CONNECTIVITY FLOW PROBLEM(S) IN A LAYER 2 AGGREGATION NETWORK

(75) Inventors: Kamakshi Sridhar, Plano, TX (US); Atiya Suhail, Plano, TX (US); David Elie-Dit-Cosaque, Richardson, TX (US); Gerard Damm, Plano, TX (US)

(73) Assignee: Alcatel Lucent, Paris (FR)

( * ) Notice: Subject to any disclaimer, the term of this patent is extended or adjusted under 35 U.S.C. 154(b) by 1039 days.

(21) Appl. No.: 11/469,223

(22) Filed: Aug. 31, 2006

(65) Prior Publication Data

US 2008/0056254 A1 Mar. 6, 2008

Related U.S. Application Data

(60) Provisional application No. 60/740,111, filed on Nov. 28, 2005.

(51) Int. Cl.
*G01R 31/08* (2006.01)

(52) U.S. Cl. .................. 370/252; 370/254; 370/390; 370/432

(58) Field of Classification Search .................. None
See application file for complete search history.

(56) References Cited

U.S. PATENT DOCUMENTS

| | | | | |
|---|---|---|---|---|
| 5,926,463 A * | 7/1999 | Ahearn et al. | ............. | 370/254 |
| 6,331,983 B1 | 12/2001 | Haggerty et al. | | |
| 6,581,166 B1 * | 6/2003 | Hirst et al. | ............. | 714/4 |
| 6,654,371 B1 * | 11/2003 | Dunstan et al. | ............. | 370/390 |
| 2002/0138854 A1 | 9/2002 | Desai | | |
| 2004/0010616 A1 | 1/2004 | McCanne | | |
| 2004/0111606 A1 * | 6/2004 | Wong et al. | ............. | 713/153 |
| 2004/0158872 A1 * | 8/2004 | Kobayashi | ............. | 725/120 |
| 2005/0091313 A1 * | 4/2005 | Zhou et al. | ............. | 709/204 |
| 2005/0157741 A1 * | 7/2005 | Wu et al. | ............. | 370/432 |
| 2007/0038743 A1 * | 2/2007 | Hellhake et al. | ............. | 709/224 |
| 2007/0162932 A1 * | 7/2007 | Mickle et al. | ............. | 725/37 |

OTHER PUBLICATIONS

Steve Deering, "Host Extension for IP Multicasting", Request for Comments 1112, Aug. 1989.*
William C. Fenner, "Internet Group Management Protocol", Request for Comments 2236, Nov. 1997.*
Kamite Y et al. "Requirements for Multicast Support in Virtual Private LAN Services" IETF Standard-Working-Draft, Internet Engineering Task Force, IETF, CH, vol. 12vpn, Oct. 17, 2005, XP015042481.
Elie-Dit-Cosaque D. et al. "Review of 802.1ag Framework" Internet Citation Mar. 12, 2004, Retrieved from the Internet: URL:www.ieee802.org/1/files/public/docs2004/Review%20of%20802.1ag%20framework1.pdf, [retrieved on Sep. 26, 2005], XP002346927.
Sridhar K. et al. "End-to-End Ethernet Connectivity Fault Management in Metro and Access Networks" Internet Citation Jun. 30, 2005, XP002346929, Retrieved from the Internet: URL:http://www.alcatel.com/com/en/appcontent/apl/T0605-CFM-EN_tcm172-288401635.pdf [retrieved on Sep. 23, 2005].
EPO Search Report for EP Patent Application No. 06 02 4581 dated Mar. 8, 2007.
PCT Search Report for PCT Patent Application No. PCT/US06/61275 dated Oct. 1, 2007.
IEEE, P802.1ag/D5.2 Virtual Bridged Local Area Networks—Amendment 5: Connectivity Fault Management, 137 pages, Dec. 6, 2005.

* cited by examiner

*Primary Examiner*—Chirag G Shah
*Assistant Examiner*—Salvador E Rivas
(74) *Attorney, Agent, or Firm*—Capital Patent & Trademark Law Firm, PLLC

(57) ABSTRACT

A diagnostic tool and method are described herein that are capable of diagnosing and localizing a multicast connectivity flow fault within a layer 2 aggregation network. In one application, the diagnostic tool and method can be used by a customer service representative to diagnose why a customer cannot receive a television channel even though they can receive other television channels within an IPTV network.

20 Claims, 9 Drawing Sheets

FIG. 6B

| DST | SRC | TYPE | VERSION | | | | |
|---|---|---|---|---|---|---|---|

126'

| | 0 | 1 | 2 | 3 |
|---|---|---|---|---|
| | MD LEVEL | VERSION | OP CODE | FLAGS | FIRST TLV OFFSET |
| 21 | TRANSACTION IDENTIFIER / SEQUENCE NUMBER | | | |
| | (ADDITIONAL FIELDS CAN BE ADDED, HERE, IN FUTURE VERSIONS OF THE PROTOCOL) | | | |
| | OPTIONAL LBM/LBR TLVs | | | |
| | END TLV (0) | | | |

511' → UNICAST MAC ADDRESS OF THE B/R 511' THAT ISSUED MULTICAST DISCOVER

DSLAM LINE CARD BEHIND WHICH portID IS THERE. THIS IS THE ADDRESS THAT IS LEARNT AT INTERMEDIATE NODES 604a

| | 0 | 1 | 2 | 3 |
|---|---|---|---|---|
| 1 | TYPE = 31 | LENGTH | OUI ... | |
| 5 | OUI ... | AN_discover | PortID, LINE CARD ADDRESS | |

AN_discover → PORT ID OF TARGET RGW

PortID, LINE CARD ADDRESS → DSLAM LINE CARD BEHIND WHICH portID IS THERE

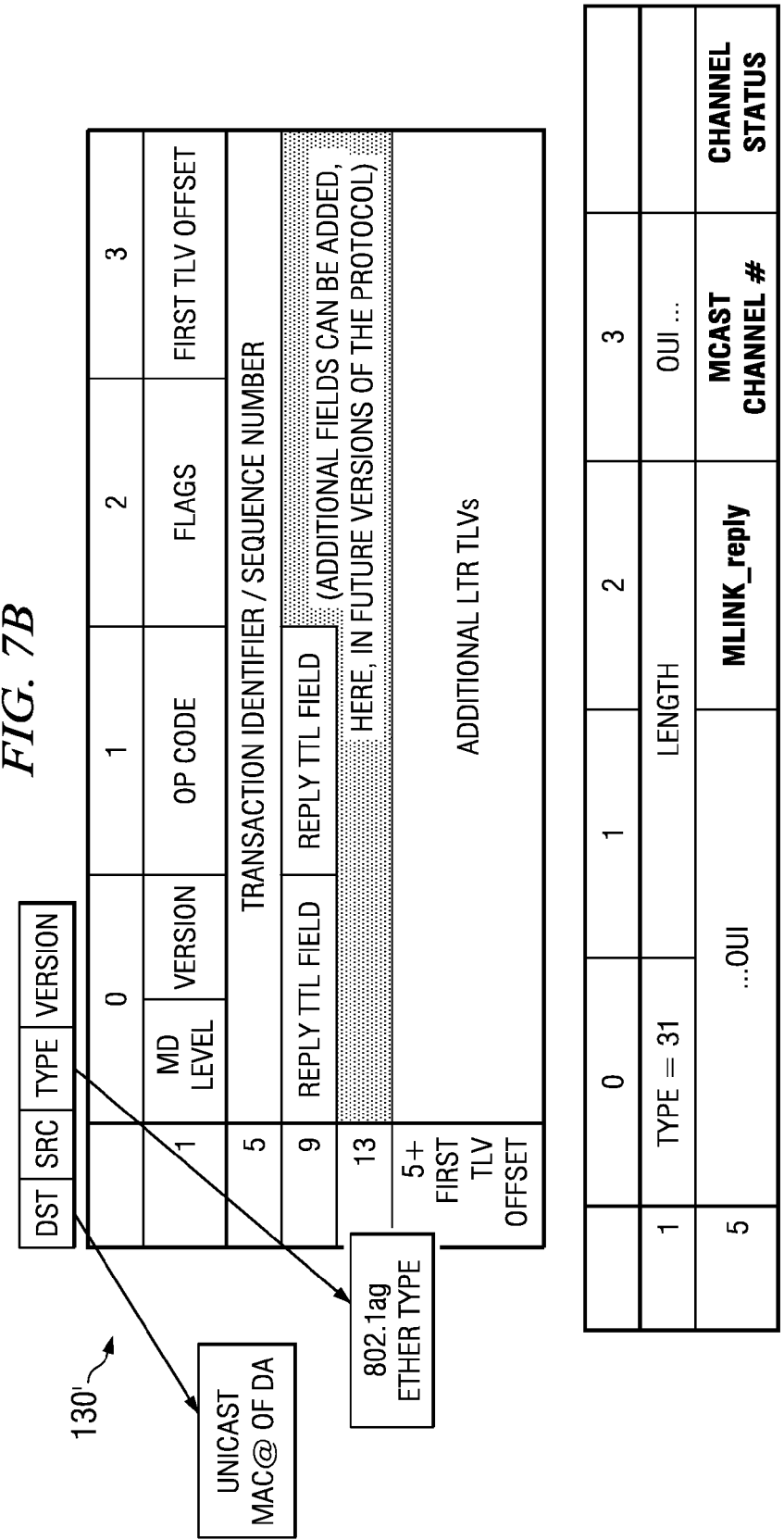

DIAGNOSTIC TOOL AND METHOD FOR TROUBLESHOOTING MULTICAST CONNECTIVITY FLOW PROBLEM(S) IN A LAYER 2 AGGREGATION NETWORK

PRIORITY UNDER 35 U.S.C. §119(e) & 37 C.F.R. §1.78

This nonprovisional application claims priority based upon the following prior United States provisional patent application entitled: "Troubleshooting a Multicast Flow Problem" Application No. 60/740,111, filed Nov. 28, 2005, in the names of: Kamakshi Sridhar, Atiya Suhail, Gerard Damm, and David Elie-Dit Cosaque, which is hereby incorporated by reference.

TECHNICAL FIELD

The present invention relates to a diagnostic tool and a method for diagnosing and localizing a multicast connectivity flow fault within a layer 2 aggregation network.

BACKGROUND

The following abbreviations are herewith defined, at least some of which are referred to in the ensuing description of the prior art and the present invention.
AN Access Node
CC Continuity Check
CO Central Office
DSLAM Digital Subscriber Line Access Multiplexer
FDB Forwarding Database
GDA Group Destination Address
IGMP Internet Group Management Protocol
IP Internet Protocol
IPTV Internet Protocol Television
IO Intermediate Office
MAC Media Access Control
MEP Maintenance End Point
MIP Maintenance Intermediate Point
RGW Residential Gateway
SAI Service Area Interface
SHE Super Headend
SNMP Simple Network Management Protocol
STB Set-Top Box
TV Television
TLV Type Length Value
VHO Video Hub Office
VLAN Virtual Local Area Network
VOD Video-On-Demand A diagnostic tool is needed today that can be used to troubleshoot a multicast connectivity flow fault along a path between a given source (source MEP) and a given destination (destination MEP) within a layer 2 aggregation network. The multicast connectivity flow fault occurs when a member/user wants to be a part of a multicast group and has issued an IGMP Join from the destination MEP towards the source MEP requesting to join that multicast group but for whatever reason does not become part of that particular multicast group. This can happen if the IGMP Join was dropped or not updated properly by one of the intermediate nodes/bridges (MIPs) located between the source MEP and the destination MEP. For example, this may happen if: (1) the IGMP Join was dropped by an intermediate node due to an overflow; (2) the IGMP proxy function within an intermediate node did not work properly; (3) the forwarding database (FDB) within an intermediate node was not properly updated; or (4) the FDB overflowed within an intermediate node. In such a situation, the layer 3 multicast could still be functional even though there is a problem at layer 2.

In one application, an IPTV network (which is a layer 2 aggregation network) can suffer from this problem when a customer does not receive a particular television channel (which is part of a particular multicast group) even though they switched to that particular television channel (issued an IGMP Join) and they can still receive and watch other television channels. In this case, the customer would call a customer service representative and the representative would have to pin-point the location of the multicast connectivity flow fault within the IPTV network. The customer service representative would do this by interacting with a console to log into a bridge (via a serial port, SNMP over IP, web server over IP) and retrieve the status of individual intermediate nodes. Plus, the customer service representative would have to manually inspect the status of each intermediate node one-by-one by browsing large databases (FDBs) to diagnose and correct the multicast connectivity flow fault. This process is very tedious and not very efficient. Accordingly, there is a need for a new diagnostic tool and a method which can be used to effectively and efficiently troubleshoot a multicast connectivity flow fault within a layer 2 aggregation network (IPTV network). This need and other needs are solved by the diagnostic tool and method of the present invention.

BRIEF DESCRIPTION OF THE INVENTION

The present invention includes a diagnostic tool and a method which are capable of diagnosing and localizing a multicast connectivity flow fault within a layer 2 aggregation network. In one embodiment, the diagnostic tool can troubleshoot the multicast connectivity flow fault within the layer 2 aggregation network by performing the following steps: (1) discovering a MAC address associated with a target device (or another device associated with the target device) (2) sending a request message which contains the discovered MAC address via one or more intermediate nodes directly towards the target device; (3) receiving one or more reply messages from the intermediate bridges and the target device; and (4) analyzing the one or more received reply messages to determine whether any of the intermediate node(s) or the target device had failed to update their forwarding database(s) because of the multicast connectivity flow/fault.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
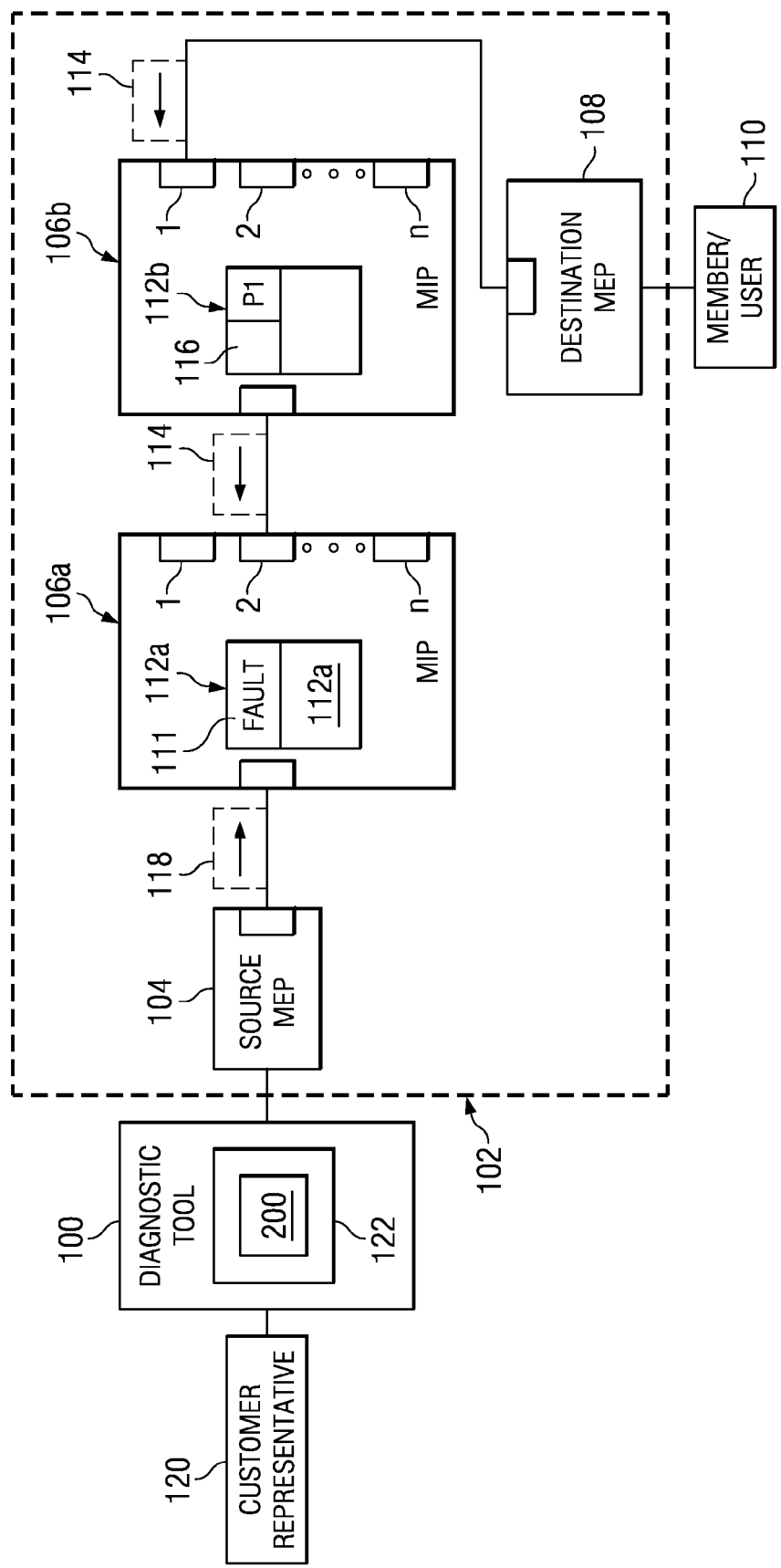
FIGS. 1-4 are diagrams which are used to help explain how a diagnostic tool and method can be used to troubleshoot a multicast flow fault that occurred within a layer 2 aggregation network in accordance with the present invention.

Referring to FIGS. 1-4, there are several diagrams which are described herein to help explain how a diagnostic tool 100 and method 200 can be used to troubleshoot a multicast flow fault that occurred within a layer 2 aggregation network 102 in accordance with the present invention. In FIG. 1, there is shown a block diagram of an exemplary layer 2 aggregation network 102 which has a source MEP 104 that is connected to a first MIP 106a (which includes ports 1, 2 . . . n). The first MIP 106a is connected to a second MIP 106b (which includes ports 1, 2 . . . n) which in turn is connected to a destination MEP 108. The diagnostic tool 100 (which implements the method 200) is shown connected to the source MEP 104. For clarity, the layer 2 aggregation network 102 which has been shown herein has a relatively simple architecture however in practice it would likely have a far more complex architecture which would include a large number of interconnected MEPs and MIPs.

The diagnostic tool 100 is used to diagnose and localize a multicast connectivity flow fault 111 which occurred somewhere along a path within a given VLAN between the source MEP 104 and the destination MEP 108 (in this example the fault 111 occurred within MIP 106a). The multicast connectivity flow fault 111 can occur when a member/user 110 (associated with destination MEP 108) wants to be a part of a multicast group and has issued an IGMP Join 114 towards the source MEP 104 requesting to join that multicast group but for whatever reason does not become part of that particular multicast group. For instance, this may happen if the IGMP Join 114 was dropped or not updated properly by one of the MIPs 106a or 106b located between the source MEP 104 and the destination MEP 108. In particular, this may happen if: (1) the IGMP Join 114 was dropped by an intermediate node 106a or 106b due to an overflow; (2) the IGMP proxy function within an MIP 106a or 106b did not work properly; (3) a FDB 112a or 112b within MIP 106a or 106b was not properly updated; or (4) the FDB 112a or 112b overflowed within MIP 106a or 106b.

To help illustrate an IGMP Join failure, assume the member/user 110 wanted to be part of a multicast group and issued an IGMP Join 114 from the destination MEP 108 which was received by MIP 106b. The MIP 106b would then update the FDB 112b therein to include a multicast identifier 116 (which identifies the desired multicast group) and a local port "p1" (the particular port which received the IGMP Join 114). Then, MIP 106a would receive the IGMP Join 114 and for whatever reason the corresponding FDB 112a therein was not properly updated to show the multicast identifier 116 and a local port "p2" (the particular port which did or should have received the IGMP Join 114). In this situation, there is an IGMP Join failure and MIP 106a would not be able to forward the desired multicast traffic 118 (originated from the source MEP 104) to the next MIP 106b, the destination MEP 106b or the user 110. This is not desirable.

The diagnostic tool 100 can diagnose and localize this multicast flow fault 111 (and other types of multicast flow faults) by implementing the method 200 as discussed hereinafter with respect to FIGS. 2-4. Basically, a person 120 (customer service representative 120) would interface with and use the diagnostic tool 100 to troubleshoot the multicast flow fault 111. However, before the person 120 would be able to troubleshoot the multicast flow fault 111, the user 110 needs to contact that person 120 and let them know they are experiencing a multicast flow fault (e.g., they are not receiving a particular television channel like CNN). The person 120 would then know the multicast identifier 116 (associated with the failed IMGP Join 114) and would also be able to look-up a port ID (at the destination MEP 108) which is associated with user 110.

The person 120 would input the port ID into the diagnostic tool 100 (shown including an operator interface/computer 122) which then performs a discovery process to: (1) learn a MAC address of the destination MEP 108; and (2) learn the direct path through the MIPS 106a and 106b to the destination MEP 108 (see step 202 in FIG. 2). As shown in FIG. 3, the diagnostic tool 100 can perform this discovery process by having the source MEP 104 flood a MAC discover message 124 (which contains the user's port ID) through-out the entire layer 2 aggregation network 102. In particular, the source MEP 104 sends the MAC discover message 124 towards MIP 106a which then forwards the MAC discover message 124 out-off every one of it's local ports 1, 2 . . . n. Then, MIP 106b receives and forwards the MAC discover message 124 out-off every one of its local ports 1, 2 . . . n.

The destination MEP 108 is going to eventually receive the MAC discover message 124 and then it is going to send a MAC reply message 126 directly back towards the source MEP 104 via MIPs 106a and 106b. Once, the MIP 106b receives the MAC reply message 126 it now knows which one of it's local ports 1, 2 . . . n (e.g., port 1) behind which resides the destination MEP 108. Then, the MIP 106b creates an entry 127b which includes [destination MEP's MAC address, local port] within the FDB 112b (or another type of database). Likewise, when the MIP 106a receives the MAC reply message 126 it now knows which one of it's local ports 1, 2 . . . n (e.g., port 2) behind which resides the destination MEP 108. The MIP 106a also creates an entry 127a which includes [destination MEP's MAC address, local port] within the FDB 112a (or another type of database). Lastly, the MIP 106a forwards the MAC reply message 126 to the source MEP 104. This discovery process is known in the art as Ethernet MAC learning.

Figure 2:
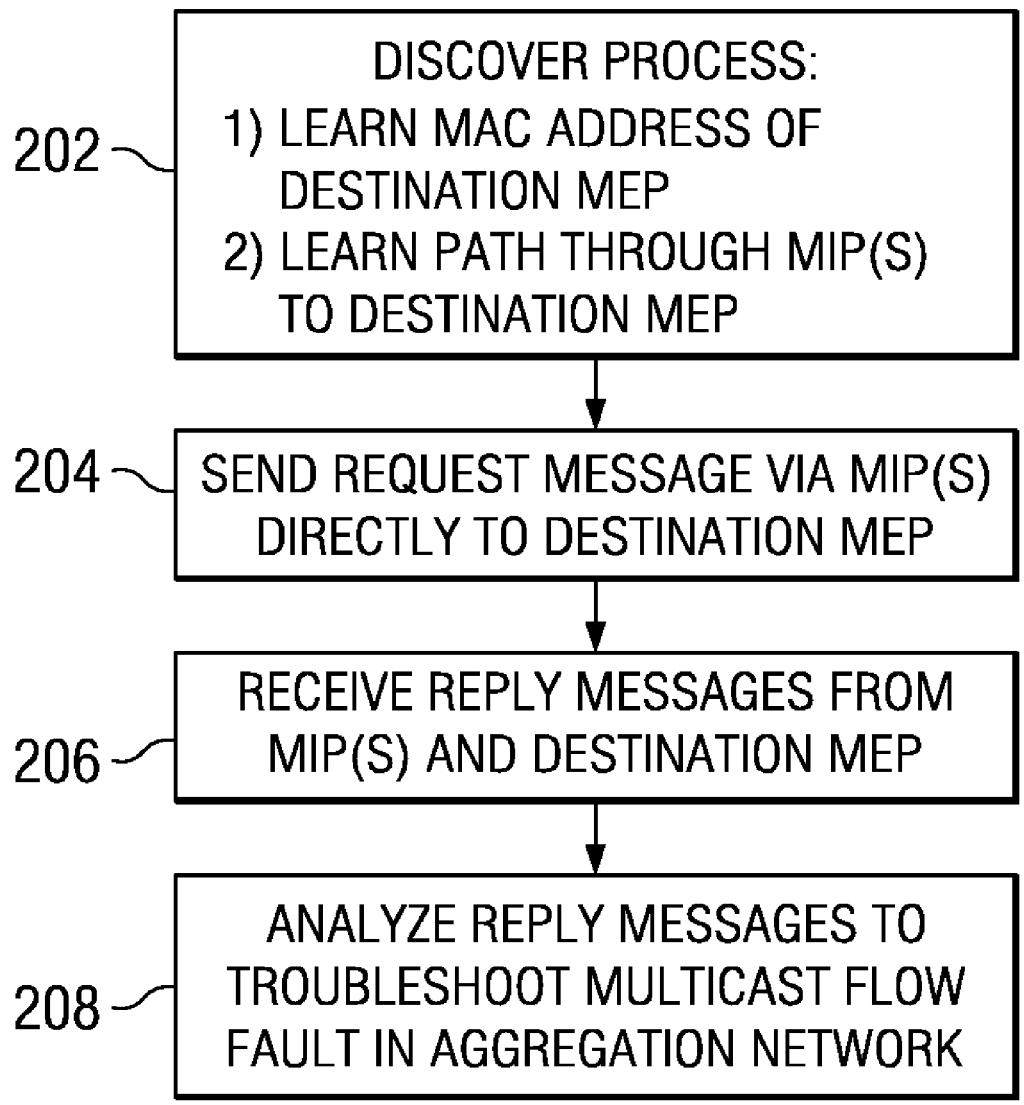
Figure 3:
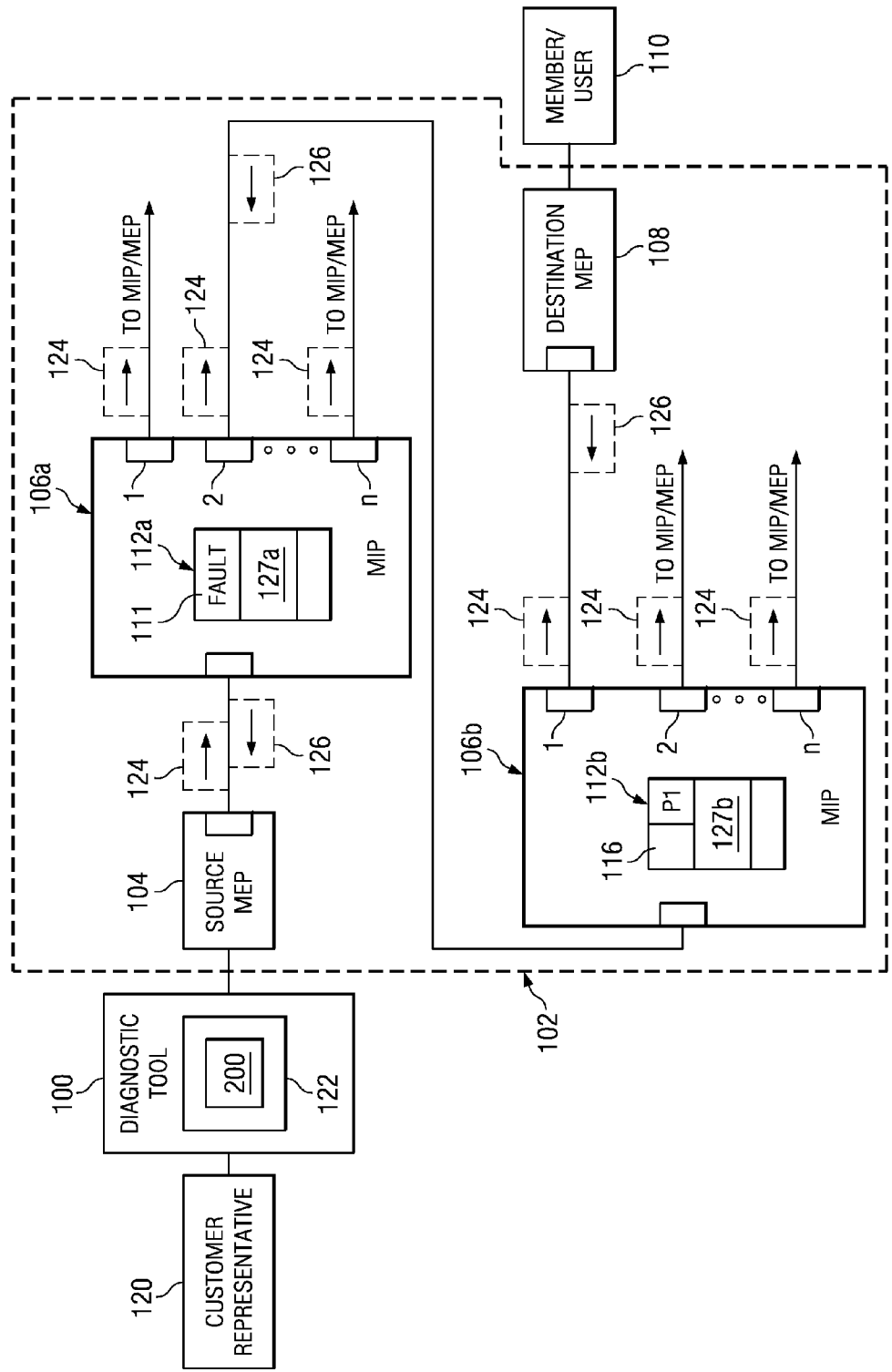
Figure 4:
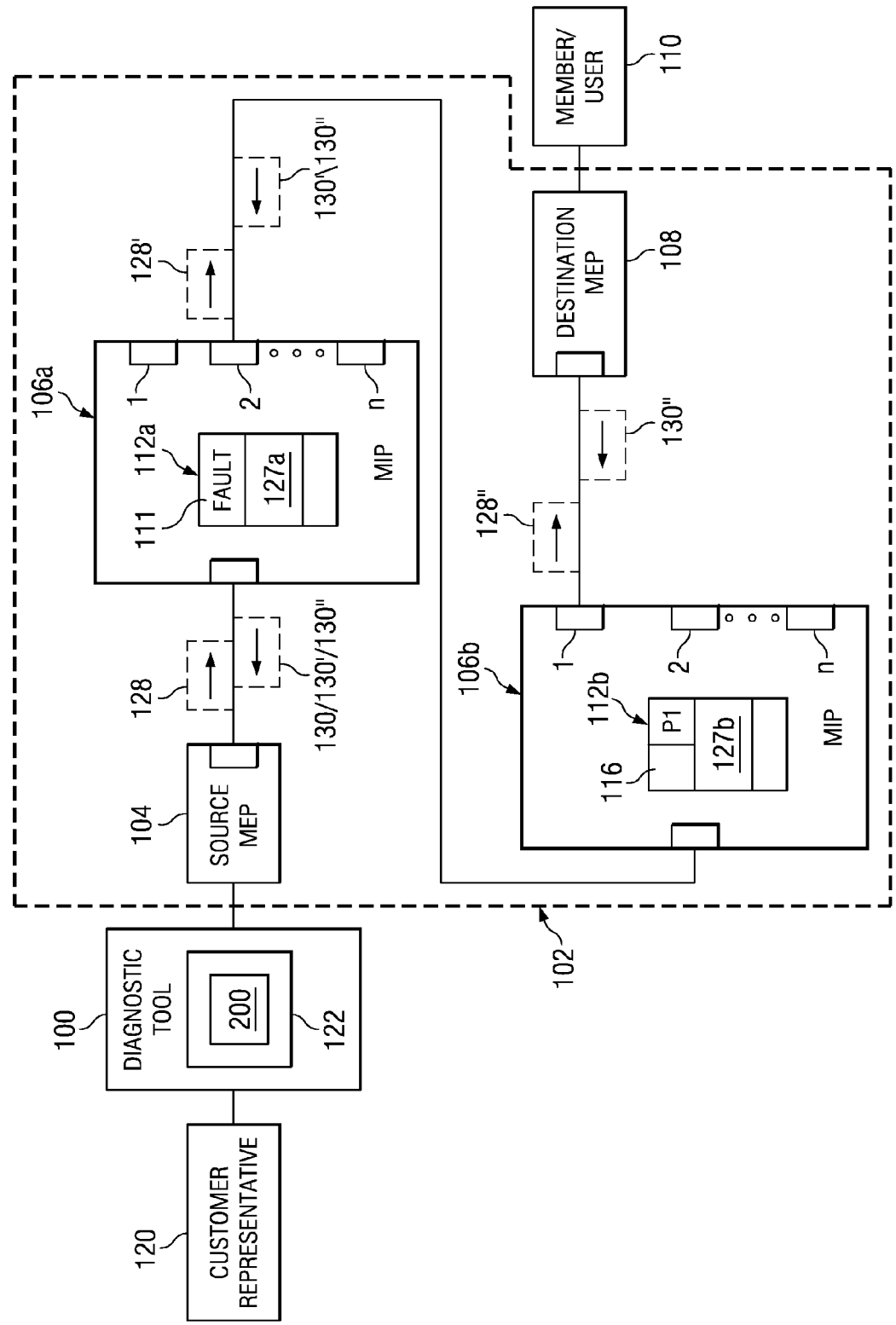

As shown in FIG. 4, the diagnostic tool 100 after performing the discovery process instructs the source MEP 104 to send a request message 128 (e.g., based on 802.1ag Link-Trace standard—the contents of which are incorporated by reference herein) which contains the recently learned MAC address (of the destination MEP 108) and the multicast identifier 116/port ID directly towards the destination MEP 108 via the MIPs 106a and 106b (step 204 in FIG. 2). The first MIP 106a upon receiving the request message 128 takes the recently learned MAC address located therein and then inspects element 127a in the FDB 112a to learn which port 1, 2 . . . n (e.g., port 2) it needs to use to forward another request message 128' to the next MIP 106b. In addition, the first MIP 106a upon receiving the request message 128 takes the multicast identifier 116 located therein along with the recently learned port (e.g., port 2) and inspects the FDB 112a to determine if there is an element which has a corresponding multicast identifier 116 stored therein that is associated with the recently learned port (e.g., port 2). The FDB 112a would have had this particular element with the multicast number 116 and the local port stored therein if there was a successful IGMP Join operation.

However, in this exemplary layer 2 aggregation network 102, the MIP 106a was where the multicast flow fault 111 occurred since the IGMP Join operation did not for whatever reason result in an updating of the FDB 112a with the requested multicast number 116 and local port (e.g., port 2) (see FIG. 1). In this case, the first MIP 106a would send a reply message 130 (e.g., based on the 802.1ag LinkTrace standard) back to the diagnostic tool 100 (step 206 in FIG. 2). The reply message 130 would have a parameter stored therein indicating that there was a multicast flow fault 111 at MIP 106a. Then, the first MIP 106a sends a new request message 128' out of the recently learned local port (e.g., port 2) directly to the second MIP 106b.

Upon receiving the request message 128', the second MIP 106b would perform the same operations associated with steps 204 and 206 and send a reply message 130' (indicating in this example that the corresponding FDB 112b had the appropriate multicast identifier 116 and local port stored therein) back to the diagnostic tool 100. Thereafter, the second MIP 106b would send another request message 128" out off the recently learned local port (e.g., port 1) directly to the destination MEP 108. The destination MEP 108 would perform the same operations associated with steps 204 and 206 and send a reply message 130" (indicating whether or not their corresponding FDB had the appropriate multicast identifier 116 and local port stored therein) back to the diagnostic tool 100. The diagnostic tool 100 would analyze the reply messages 130, 130' and 130" to diagnose and localize the multicast flow fault 111 (see step 208 in FIG. 2).

Figure 5:
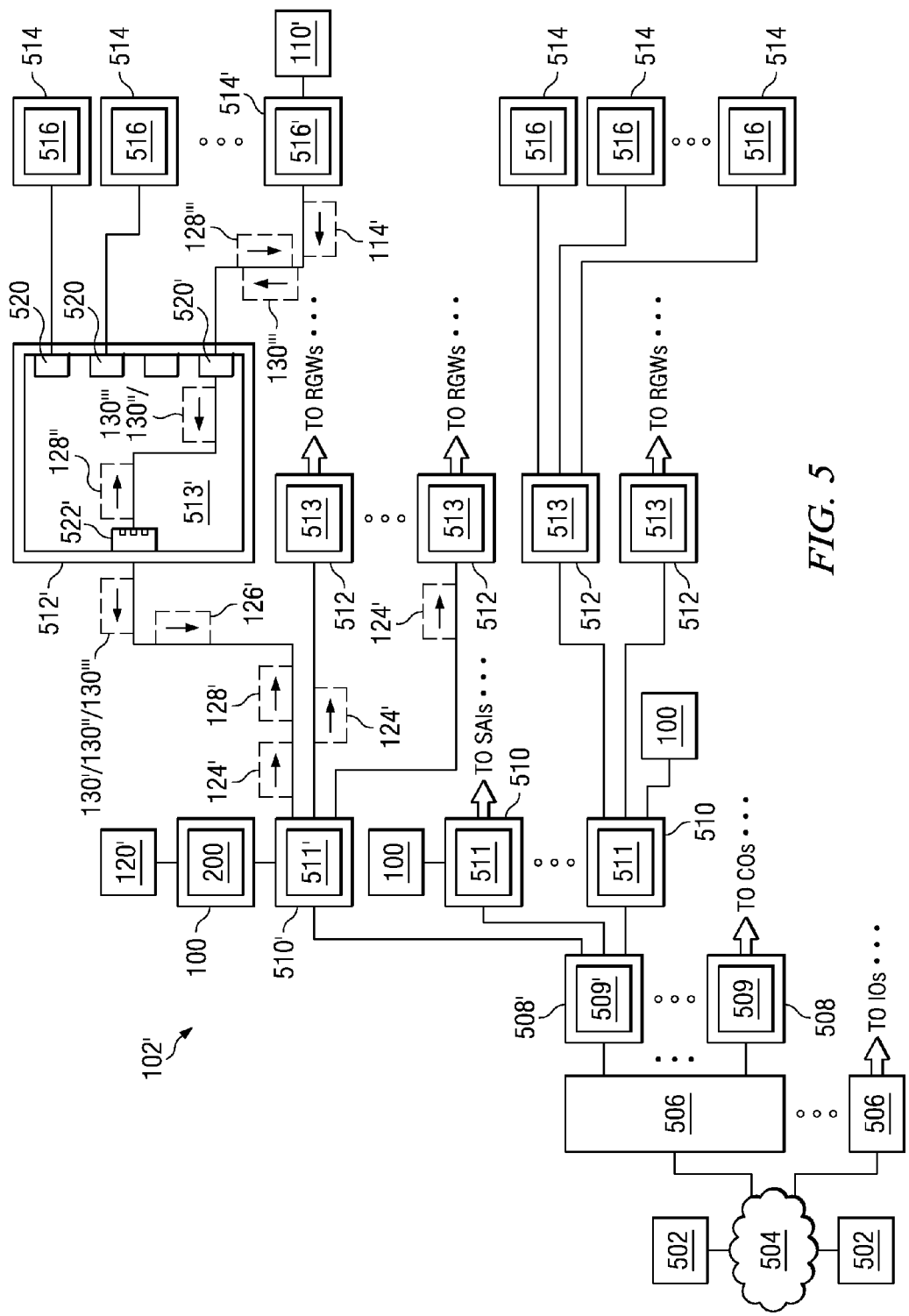
FIGS. 5-7 are diagrams which are used to help explain how the diagnostic tool and method can be used to diagnose why a customer cannot receive a particular television channel (or be part of a particular multicast group) even though they switched to that particular television channel (issued a IGMP Join) and they can still receive and watch other television channels that are broadcast by an IPTV network in accordance with one application of the present invention.

In one application, the diagnostic tool 100 and method 200 can be used to troubleshoot why a customer 110' cannot receive a particular television channel (or be part of a particular multicast group) even though they switched to that particular television channel (issued a IGMP Join 114') and they can still receive and watch other television channels which were broadcast by an IPTV network 102' (which is a layer 2 aggregation network 102). FIG. 5 is a block diagram that illustrates the architecture of an exemplary IPTV network 102' which is used to help explain how the diagnostic tool 100 and method 200 can be used to troubleshoot a multicast flow fault in accordance with the present invention.

As shown, the exemplary transport network 102' includes two super head-ends 502, a backbone network 504, multiple VHOs 506, multiple IOs 508, multiple COs 510, multiple SAIs 512 and multiple RGWs 514. In operation, each super head-end 502 receives international TV feeds and supplies those international TV feeds via the backbone network 504 to each VHO 506. Then, each VHO 506 receives local TV feeds and multicasts all of the TV feeds to their respective IOs 508 (which has a router 509). And, each IO 508 multicasts all of the TV feeds to their respective COs 510 (which has the diagnostic tool 100 attached to a bridge/router 511) (note: the diagnostic tool 100 if desired could be connected to the router 509 located in the IO 508). Then, each CO 510 multicasts all of the TV feeds to their respective SAIs 512 (which includes a DSLAM 513). And, each SAI 512 then multicasts all of the TV feeds to their respective RGWs 514 (which are associated with STBs 516). In this way, the users 110' can interface with their STB 516 and select one of the multicast TV channels to watch on their TV. The transport network 102' may also provide voice (telecommunications) and data (Internet) to the homes via the DSL phone lines.

If the IPTV network 102' has a multicast connectivity flow fault, then the customer 110' would not receive a particular television channel like CNN (which is part of the TV feed's multicast group) even though they switched to that particular television channel (issued an IGMP Join 114') and they can still receive and watch other television channels. In this example, the diagnostic tool 100 is shown attached to the bridge/router 511' which is located within the CO 510'. Plus, the diagnostic tool 100 troubleshoots a multicast flow fault that occurred within either the bridge/router 511' (associated with the CO 510'), the DSLAM 513' (associated with the SAI 512') or the RGW 514' (associated with the STB 516') which is used by customer 110'. The multicast flow fault can occur when a FDB located within the bridge/router 511', the DSLAM 513' or the RGW 514' has not been properly populated during the IGMP Join operation. Each multicast FDB would be properly populated if it contained the MCAST Channel No. (which identifies the queried television channel) and the local port (behind which resides the RGW 514'). In this embodiment, the MCAST Channel No. could be represented as an IP address, an Ethernet MAC address or a GDA.

When there is a multicast flow fault, the customer 110' would call a customer service representative 120' and then the representative 120' would have to interface with the diagnostic tool 100 to locate, diagnose and correct the particular multicast flow fault so the customer 110' can receive and watch that particular television channel. To accomplish this, the customer service representative 120' would ask the customer 110' what is the problematical TV channel (to obtain the MCAST Channel No.) and then they would look-up the port ID (at the target RGW 514') associated with the customer 110'. Thereafter, the customer service representative 120' would instruct the diagnostic tool 100 to perform a discovery process to: (1) learn a MAC address of a line card 520' in the DSLAM 513' behind which resides the target ring 514' (note: the MAC address of the RGW 514' or the MAC address of a bridge 522 within the DSLAM 513' could also be learned so long as the MAC address learned is associated with the target RGW 514'); and (2) learn the direct path through the bridge/router 511' and the DSLAM 513' to the target RGW 514' (see step 202 in FIG. 2).

In one embodiment, the diagnostic tool 100 can perform this discovery process as follows (see step 202 in FIG. 2):

1. The bridge/router 511' floods a MAC discover message 124' out of all of it's ports 1, 2 . . . n (see FIG. 5).

Figure 6A:
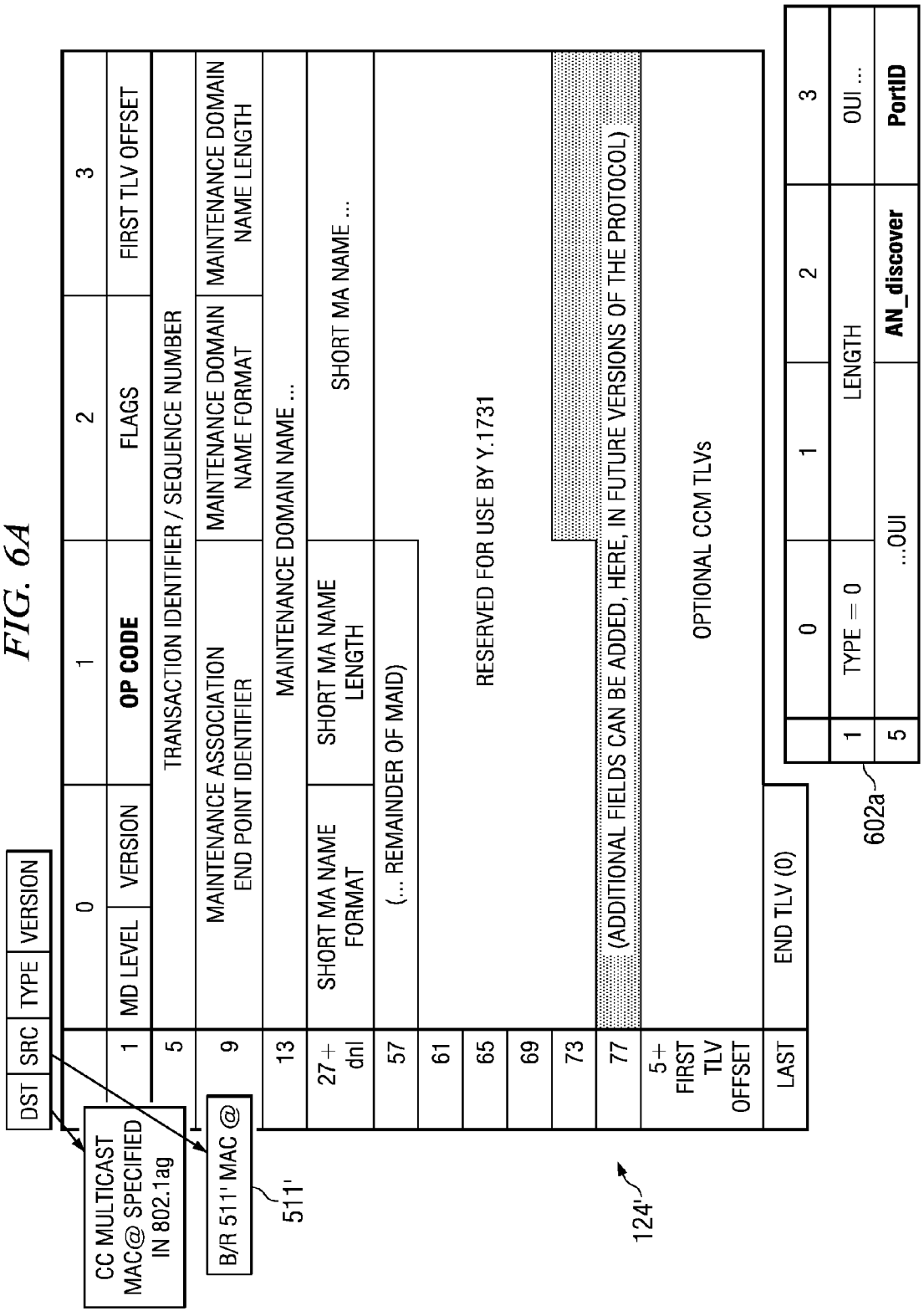

FIG. 6A is a diagram that illustrates the format of an exemplary MAC discover message 124' (e.g., based on 802.1ag Connectivity Check—the contents of which are incorporated by reference herein) (note: some fields are not shown). The new portions associated with this MAC discover message 124' have been identified by BOLD letters to highlight the new portions when compared to the traditional 802.1ag Connectivity Check message. The new portions include: (1) an OpCode (instructions to look at an organization specific TLV 602a); and (2) an organization specific TLV 602a (which includes an AN_discover and a port ID of target RGW 514').

2. Each DSLAM 513 (three shown associated with CO 510') and in particular a bridge 522 located therein receives the MAC discover message 124' and broadcasts it to all of the line cards 520 located therein.

3. Each line card 520 (associated with the DSLAMs 513 connected to CO 510') upon receiving the MAC discover message 124' looks at this message to see if it has a port ID associated with the target RGW 514'.

4. Only the line card 520' that is associated with the port ID of the target RGW 514' will respond to the MAC discover message 124' by sending a MAC reply message 126' which contains that particular line card's MAC address.

FIG. 6B is a diagram that illustrates the format of an exemplary MAC reply message 126' (e.g., based on 802.1ag Connectivity Check) (note: some fields are not shown). The new portions associated with the MAC reply message 126' have been identified by BOLD letters to highlight the new portions when compared to the traditional 802.1ag Connectivity Check message. The new portion includes an organization specific TLV 604a (which includes (a) an AN_discover; (b) a port ID of target RGW 514'; and (c) the MAC address of the line card 520' behind which resides the the target RGW 514').

5. As a result of sending the MAC reply message 126', all of the intermediate nodes which in this example include the bridge 522' in DSLAM 513' and the bridge/router 511' learn the local port behind which resides the target RGW 514'. Each of these intermediate nodes creates an entry in their FDB which has [DSLAM line card's MAC address, local port].

*Note 1: The discovery process would not be needed if the bridge/router 511', DSLAM 513 etc . . . knew the MAC address of the line card 520' and the local port behind which resides the target RGW 514'.

Note 2: The frames associated with the exemplary MAC discover message 124' (FIG. 6A) and the exemplary MAC reply message 126' (FIG. 6B) happen to be based on a draft of the 802.1ag specification. As such, it should be appreciated that the locations of the various fields in these messages 124' and 126' could change and this change or other changes would not affect the scope of the present invention.

After the discovery process, the diagnostic tool 100 perform as follows (see steps 204, 206 and 208 in FIG. 2):

1. The diagnostic tool 100 generates a request message 128' which is sent out the local port of the bridge/router 511'. The request message 128' contains the recently learned MAC address (of the line card 520' in the DSLAM 513') and the multicast identifier 116'/port ID associated with the target RGW 514'.

Figure 7A:
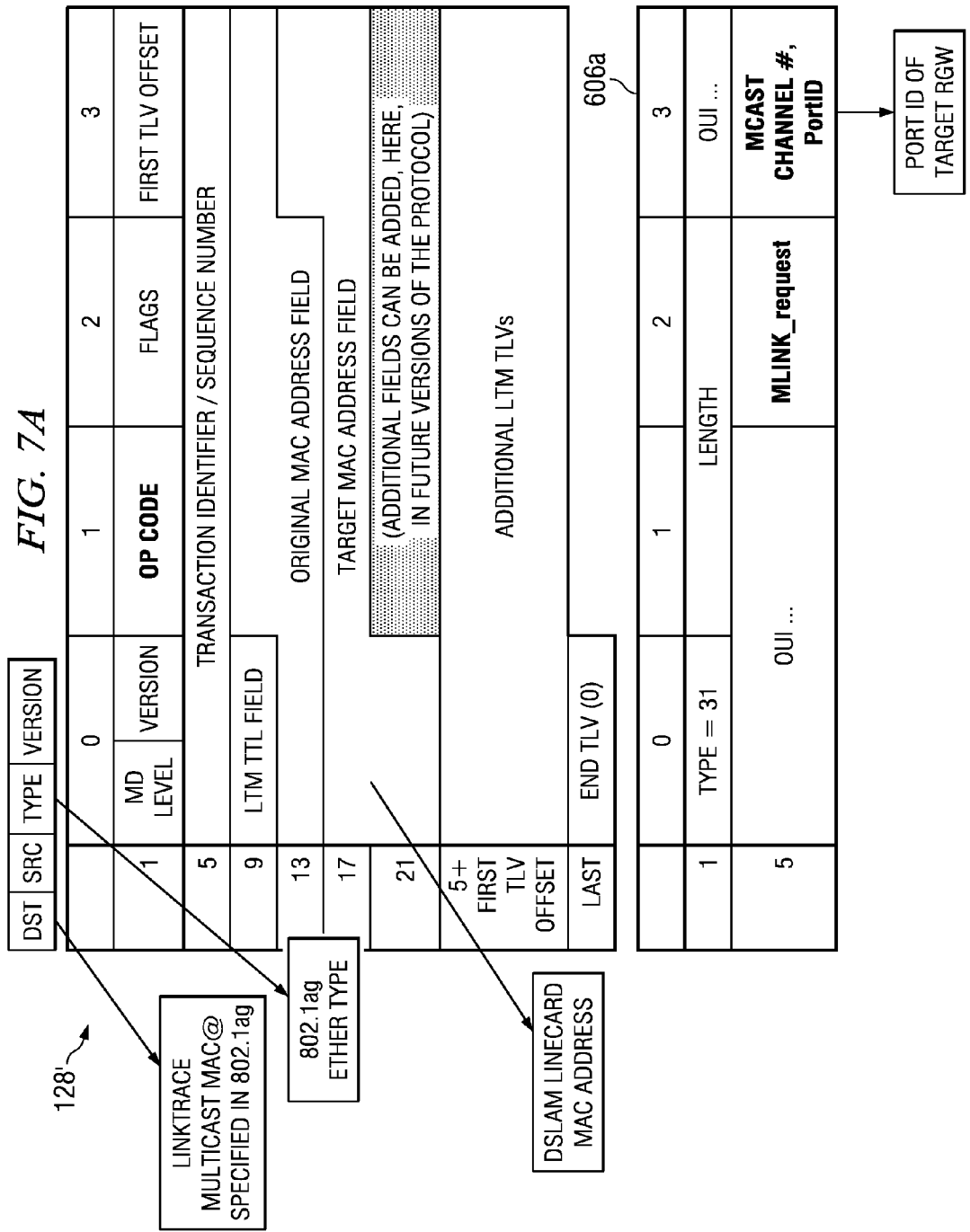

FIG. 7A is a diagram that illustrates the format of an exemplary request message 128' (e.g., based on 802.1ag LinkTrace standard—the contents of which are incorporated by reference herein) (note: some fields are not shown). The new portions associated with the request message 128' have been identified by BOLD letters to highlight the new portions when compared to the traditional 802.1ag LinkTrace message. The new portions include: (1) an OpCode (instructions to look at an organization specific TLV 606*a*); and (2) the organization specific TLV 606*a* (which includes a MLINK_request, a MCAST Channel # and the port ID of the target RGW 514'.

2A. The DSLAM 513' and in particular the bridge 522' therein receives the request message 128' inspects the learned MAC address located therein and then inspects it's FDB to learn which local port 1, 2 . . . n it needs to use to forward another request message 128" to the correct line card 520'. For instance, the new request message 128' can be forwarded to the correct line card 520' in one of two ways: (1) the bridge 522' gets the port ID from the TLV 606*a* in the received request message 128' and determines the local port out which the new request message 128" is to be forwarded to the correct line card 520' behind which resides the target RGW 514'; or (2) this information may have been learnt in the discovery process (step 202 in FIG. 2).

2B. The DSLAM 613' and in particular the bridge 522' receives the request message 128' inspects the multicast identifier 116/port ID located therein and then inspects it's FDB to determine if there is a corresponding multicast number stored therein that is associated with the local port which leads to the target RGW 514'. The particular FDB would have the multicast number 116 and the local port stored therein if the IGMP Join operation was properly performed.

If there is a corresponding multicast number/local port stored in the FDB, then the bridge 522' sends a reply message 130' which indicates the television channel is reachable back to the diagnostic tool 100.

If there is not a corresponding multicast number/local port stored in the FDB, then the bridge 522' sends a reply message 130' which indicates the television channel is not reachable back to the diagnostic tool 100.

FIG. 7B is a diagram that illustrates the format of an exemplary reply message 130' (e.g., based on 802.1ag LinkTrace standard) (note: some fields are not shown). The new portions associated with the reply message 130' have been identified by BOLD letters to highlight the new portions when compared to the traditional 802.1ag LinkTrace message. The new portions include an organization specific TLV 608*a* (which includes a MLINK_reply, a MCAST Channel # and a Channel Status (whether the channel is reachable or not reachable).

3. The line card 520' receives and inspects the request message 128" and then sends a reply message 130" back to the diagnostic tool 100. In addition, the line card 520' forwards a new request message 128''' to the target RGW 514'.

4. The target RGW 514' receives and inspects the request message 128''' and then sends a reply message 130''' (back to the diagnostic tool 100).

5. The diagnostic tool 100 analyzes the received reply messages 130, 130' and 130" and diagnoses and localizes the multicast flow fault within the IPTV network 102'. Then, the customer service representative 120' can correct the multicast flow fault at the bridge/router 511', the DSLAM 513' or the RGW 514' so the customer 110' can receive and watch the desired television channel (which is associated with MCAST Channel #).

Note 1: The frames associated with the exemplary request message 128' (FIG. 7A) and the exemplary reply message 130' (FIG. 7B) happen to be based on a draft of the 802.1ag specification. As such, it should be appreciated that the locations of the various fields in these messages 128' and 130' could change and this change or other changes would not affect the scope of the present invention.

Although one embodiment of the present invention has been illustrated in the accompanying Drawings and described in the foregoing Detailed Description, it should be understood that the present invention is not limited to the embodiment disclosed, but is capable of numerous rearrangements, modifications and substitutions without departing from the spirit of the invention as set forth and defined by the following claims.

What is claimed is:

1. A method for troubleshooting a multicast flow fault which was caused by an unsuccessful Internet Group Management Protocol (IGMP) join operation within a layer 2 aggregation network, said method comprising the steps of:

flooding a MAC discover message which contains a port identification of a target device which had initiated the IGMP join operation through-out at least a portion of said layer 2 aggregation network to discover a MAC address associated with the target device;

receiving a MAC reply message which contains the MAC address from said target device or from a device which is associated with said target device;

sending a request message which contains the discovered MAC address via one or more intermediate nodes towards said target device;

receiving one or more reply messages from said one or more intermediate nodes and said target device; and analyzing the one or more received reply messages to determine which one of the intermediate nodes and/or the target device had not updated a forwarding database because of the unsuccessful IGMP join operation.

2. The method of claim 1, wherein each intermediate node upon receiving the MAC reply message keeps track of both the discovered MAC address and a local port which received the MAC reply message.

3. The method of claim 2, wherein each intermediate node upon receiving said request message inspects the discovered MAC address and forwards a new request message out the local port towards the target device.

4. The method of claim 2, wherein each intermediate node and said target device upon receiving said request message inspects a multicast number located therein and queries the forwarding database to determine if there is a corresponding multicast number stored therein which is associated with the target device.

5. The method of claim 4, wherein each intermediate node and said target device which makes a positive determination then sends the reply message which indicates that the multicast number associated with the target device was stored within the forwarding database.

6. The method of claim 4, wherein each intermediate node and said target device which makes a negative determination then sends the reply message which indicates that the multicast number associated with the target device was not stored within the forwarding database.

7. The method of claim 4, wherein said multicast number is:
   an IP address; or
   an Ethernet MAC address.

8. A diagnostic tool for troubleshooting a multicast flow failure which was caused by an unsuccessful Internet Group Management Protocol (IGMP) join operation within a layer 2 aggregation network, said diagnostic tool comprising:
   an operator interface which facilitates the following steps:
   flooding a MAC discover message which contains a port identification of a target device which had initiated the IGMP join operation through-out at least a portion of said layer 2 aggregation network to discover a MAC address associated with the target device;
   receiving a MAC reply message which contains the MAC address from said target device or from a device which is associated with said target device;
   sending a request message which contains the discovered MAC address via one or more intermediate nodes towards said target device;
   receiving one or more reply messages from the one or more intermediate bridges and said target device; and
   analyzing the one or more received reply messages to determine which one of the intermediate nodes and/or the target device had not updated a forwarding database because of the unsuccessful IGMP join operation.

9. The diagnostic tool of claim 8, wherein each intermediate node upon receiving the MAC reply message keeps track of both the discovered MAC address and a local port which received the MAC reply message.

10. The diagnostic tool of claim 9, wherein each intermediate node and said target device upon receiving said request message inspects the discovered MAC address and forwards a new request message out the local port towards the target device.

11. The diagnostic tool of claim 9, wherein each intermediate node and said target device upon receiving said request message inspects a multicast number located therein and queries the forwarding database to determine if there is a corresponding multicast number stored therein which is associated with the target device.

12. The diagnostic tool of claim 11, wherein each intermediate node which makes a positive determination then sends the reply message which indicates that the multicast number associated with the target device was located within the forwarding database.

13. The diagnostic tool of claim 11, wherein each intermediate node which makes a negative determination then sends the reply message which indicates that the multicast number associated with the target device was not located within the forwarding database.

14. The diagnostic tool of claim 11, wherein said multicast number is:
   an IP address; or
   an Ethernet MAC address.

15. A layer 2 aggregation network, comprising:
   a diagnostic tool;
   a first Maintenance End Point (MEP);
   one or more Maintenance Intermediate Points (MIPs); and
   a second MEP, wherein said diagnostic tool interfaces with said first MEP and troubleshoots a multicast flow failure caused by an unsuccessful Internet Group Management Protocol (IGMP) join operation by performing as follows:
   discovering a MAC address which is associated with said second MEP, said discovering steps includes:
   flooding a MAC discover message which contains a port identification of said second MEP out off said first MEP; and
   receiving a MAC reply message which contains the MAC address from said second MEP, wherein each MIP and said first MEP which receives the MAC reply message keeps track of both the discovered MAC address and a local port which received the MAC reply message;
   sending a request message which contains the discovered MAC address towards said second MEP via the one or more MIPs, wherein:
   each MIP which receives said request message inspects the discovered MAC address and forwards a new request message out the local port behind which resides the second MEP;
   each MIP and said second MEP which receives said request message inspects a multicast number located therein and queries a forwarding database to determine if there is a corresponding multicast number stored therein which is associated with the second MEP;
   wherein each MIP and said second MEP which makes a positive determination then sends a reply message which indicates that the multicast number associated with said second MEP was stored within the forwarding database; or
   wherein each MIP and said second MEP which makes a negative determination then sends a reply message which indicates that the multicast number associated with said second MEP was not stored within the forwarding database;
   receiving one or more reply messages from the one or more MIPs and said second MEP; and
   analyzing the received reply messages to determine which one of the MIPs and/or said second MEP had failed to update their multicast forwarding database because of the unsuccessful IGMP join operation.

16. A method for troubleshooting a multicast flow failure which was caused by an unsuccessful Internet Group Management Protocol (IGMP) join operation within a layer 2 aggregation network, said method comprising the steps of:
   sending a request message which contains a MAC address associated with a target device which initiated the IGMP join operation, obtained by flooding a MAC discover message which contains a port identification of the target device through-out at least a portion of said layer 2 aggregation network, via one or more intermediate nodes towards said target device;

receiving one or more reply messages from said one or more intermediate nodes and said target device; and analyzing the one or more received reply messages to determine which one of the intermediate nodes and/or said target device had failed to update a forwarding database because of the unsuccessful IGMP join operation.

17. The method of claim 16, wherein each intermediate node upon receiving said request message inspects the MAC address and forwards a new request message out the local port behind towards the target device.

18. The method of claim 16, wherein each intermediate node upon receiving said request message inspects a multicast number located therein and queries the forwarding database to determine if there is a corresponding multicast number stored therein which is associated with the target device.

19. The method of claim 18, wherein each intermediate node and said target device which makes a positive determination then sends the reply message which indicates that the multicast number associated with said target device was stored within the forwarding database.

20. The method of claim 18, wherein each intermediate node and said target device which makes a negative determination then sends the reply message which indicates that the multicast number associated with said target device was not stored within the forwarding database.

* * * * *